United States Patent Office  3,462,484
Patented Aug. 19, 1969

3,462,484
CONDENSATION OF ACRYLIC ACID
Arthur W. Schnizer and Edward N. Wheeler, Corpus Christi, Tex., assignors to Celanese Corporation, a corporation of Delaware
No Drawing. Original application Oct. 20, 1959, Ser. No. 847,471, now Patent No. 3,176,042, dated Mar. 30, 1965. Divided and this application Mar. 13, 1964, Ser. No. 357,852
Int. Cl. C07c 51/42, 57/04
U.S. Cl. 260—526  5 Claims

ABSTRACT OF THE DISCLOSURE

A process for obtaining liquid acrylic acid from vapors thereof without undue polymer formation by maintaining the vapors in a superheated condition and adding a polymerization inhibitor to the superheated vapors before allowing them to condense. The inhibitor and conditions are such that the inhibitor volatilizes at the temperature of the superheated vapors.

---

The present application is a divisional of Ser. No. 847,471 filed Oct. 20, 1959, now U.S. Patent 3,176,042 issued Mar. 30, 1965.

This invention relates to the production of unsaturated acids and relates more particularly to the production of acrylic acid.

It is an object of this invention to provide a new and highly efficient method for the production of acrylic acid from propiolactone.

Other objects of this invention will be apparent from the following detailed description and claims.

In accordance with one aspect of this invention, propiolactone is brought into contact with heated phosphoric acid to produce vapors of acrylic acid. While we do not wish to be bound by any particular theory we believe that the propiolactone forms a complex or adduct with the phosphoric acid (e.g., an adduct of the formula $(HO)_2PO-O-CH_2CH_2COOH$), and that the complex then breaks down thermally to produce acrylic acid and regenerate the phosphoric acid.

In a preferred form of the invention liquid propiolactone is forced continuously into contact with a hot liquid mass of the phosphoric acid while vapors of acrylic acid are taken off continuously overhead. Best results are obtained when the phosphoric acid is maintained at a subatmospheric pressure since this makes possible the use of lower temperatures in the process. The use of reduced pressure also results in a lower concentration of acrylic acid in the reaction mass which reduces the tendency of the material to polymerize. Pressures below about 200 mm. Hg A. are particularly suitable. Economically it is not advantageous to reduce the pressure below about 20 mm. Hg A., because of the difficulty of subsequently condensing the acrylic acid vapors at such pressures, if condensers operating at about room temperature are employed.

It is preferable to operate under such conditions that the difference between the temperature of the phosphoric acid and the boiling point of the acrylic acid at the operating pressure is at least about 50° C.; this makes for rapid flashing of the acrylic acid vapors from the mass of phosphoric acid. The temperature is advantageously above about 140° C., preferably above about 150° C. Since phosphoric acid becomes increasingly corrosive to ordinary reactor materials as the temperature increases, it is desirable to operate at temperatures below about 220° C., preferably below about 180° C.

The choice of the best feed rate depends on the temperatures and pressures used; desirably it is such that the acrylic acid is volatilized at a rate approximately corresponding to the rate of feed, so that there is little if any buildup of acrylic acid in the phosphoric acid during operation. For example, a preferred rate of feed is less than 0.4, preferably less than 0.2, gram of propriolactone per gram of $H_3PO_4$ per hour.

It is advantageous to introduce a stream of liquid propiolactone below the upper level of a thoroughly agitated mass of the phosphoric acid; thorough agitation can be obtained, for example, by the use of a mechanical stirrer.

To obtain highest purity acrylic acid it is desirable to use relatively pure propiolactone in the feed. For example, when propiolactone of 98% purity is used the product contains 96%, or more, of acrylic acid, without further purification. However, the propiolactone need not be of high purity. For example, monomeric propiolactone containing appreciable proportions of acetic acid, acetic anhydride or other acetoxy compounds, or propiolactone polymers, may be used. Acetic anhydride in the feed is primarily hydrolyzed to acetic acid during the reaction while propiolactone dimer and other propiolactone polymers are converted to acrylic acid.

For most purposes it is desirable that acrylic acid contain little if any water. We have found that the water content of the product depends in large measure on the water content of the phosphoric acid; thus, by reducing the water content of the phosphoric acid until its empirical composition is about 100% $H_3PO_4$, or $P_2O_5(H_2O)_3$, we can reduce the water content of the acrylic acid vapors to a very low value. A suitable phosphoric acid for this purpose may be prepared conveniently by removing water from aqueous phosphoric acid (e.g., commercial phosphoric acid containing 70–75% phosphoric acid), as by evaporation while heating under subatmospheric pressure. The phosphoric acid in the dehydrated product is present as a mixture of orthophosphoric acid, pyrophosphoric acid and higher molecular weight phosphoric acids, depending on the extent of dehydration. Thus, the dehydration may be continued until there is much less water present than is represented by the empirical formula for orthophosphoric acid, $P_2O_5(H_2O)_3$. The dehydration may proceed further during continuous operation with the result that the catalyst may tend to become more viscous and, eventually to become a difficultly handled mass, solid at the reaction temperature. We have found that the catalyst can be maintained in a liquid condition by the continual addition of water thereto. This is conveniently effected by continual removal of a portion of the catalyst (e.g., about 5 to 20% at daily intervals) and replacement thereof with liquid phosphoric acid (e.g., of 50 to 85% concentration) or by the incorporation of a small amount of water (e.g. ½%) into the propiolactone feed. Alternatively, water can be added directly to the thickened catalyst. Conveniently the liquid phosphoric acid used for the above-mentioned continual replacement is obtained by adding sufficient water to a portion of the thickened catalyst to thin said catalyst to a filterable viscosity; we have found that this causes any carbonaceous impurities present to agglomerate, after which the catalyst can be filtered and reused.

To prevent polymerization of the acrylic acid in the reaction vessel it is desirable to have present a polymerization inhibitor. Such materials are well known in the art. For example, copper powder may be mixed with the phosphoric acid, or the walls of the reaction vessel may be made of copper, which acts as an inhibitor.

This invention makes it possible to produce acrylic acid of high purity directly at very high efficiencies. The catalyst can be used for long periods without loss of its activity. In contrast to the known process of making acrylic acid from propiolactone by polymerization followed by thermal depolymerization the process of this invention requires only a single step, with an attendant saving in equipment for processing and handling the reactants and a reduction in losses of material. In addition, the acrylic acid produced by the pyrolysis of propiolactone polymer is generally contaminated with propiolactone dimer which must be removed by distillation; the present invention makes it possible to avoid such distillation, since, as previously discussed, propiolactone dimer is decomposed by the phosphoric acid catalyst.

To insure maximum recovery of the acrylic acid produced it is desirable to prevent polymerization of the acrylic acid. As another aspect of this invention, we have found that polymerization results upon the liquefaction (condensation) of vapors of uninhibited acrylic acid. We have also discovered that such polymerization may be prevented by maintaining the vapors in superheated condition, preventing liquefaction until the superheated vapors have been mixed with a volatile polymerization inhibitor, and then condensing the vapors and inhibitor together. Particularly suitable inhibitors are phenolic materials such as hydroquinone and the monomethyl ether of hydroquinone. An especially effective method for supplying the inhibitor is by flashing a liquid solution thereof in acrylic acid into the superheated vapors of acrylic acid. For example, a 0.1 to 10% solution of the volatile inhibitor in acrylic acid may be introduced into the superheated vapors of acrylic acid in an amount sufficient to provide a concentration of about 10 to 200 p.p.m. of inhibitor in the resulting mixture. Thereafter the mixture can be liquefied, as by cooling, or by increasing the pressure.

The following example is given to illustrate this invention further.

Example

Aqueous phosphoric acid (of 85% concentration) was dehydrated by heating it, in known manner, until its empirical composition was 100% $H_3PO_4$. 2% (based on the weight of the dehydrated phosphoric acid) of copper powder was added and the liquid beta-propiolactone (of about 97% purity) mixed with 0.5% of its weight of water was pumped continuously into the hot liquid dehydrated phosphoric acid, beneath the surface of the phosphoric acid, while the latter was stirred and maintained at a temperature of 170° C. under a pressure of 100 mm. Hg A. The rate of feed of the propiolactone was 0.116 gram per gram $H_3PO_4$ per hour. Superheated acrylic acid distilled from the liquid phosphoric acid. After passing from the reaction zone, the stream of acrylic acid was treated by spraying into it continuously a 0.1% solution of mono methyl ether of hydroquinone in liquid acrylic acid, in an amount such as to provide a concentration of 100 p.p.m. of the hydroquinone ether in the resulting mixture. The resulting gaseous stream was then passed through a condenser at a temperature of about 15° C. Liquid acrylic acid of 97% purity was obtained in a yield of 101% based on the propiolactone present in the feed. The yield above 100% was due to the fact that the lactone feed contained minor proportions of impurities (such as, acryloxypropionic acid, acrylic anhydride and hydroxypropionic acid) which were also converted to acrylic acid in the process. The walls of the reactor and of conduits with which the uninhibited acrylic acid vapors came into contact were maintained heated, at a temperature of 170° C.; this is above the dew point of the acrylic acid at the pressure in the system and thus prevents condensation of acrylic acid on said walls.

It was found that after 290 hours of continuous operation the phosphroic acid catalyst still had not lost its activity. The catalyst at this point was a semi-solid when cooled to room temperature.

While the invention has been described in detail in relation to the production of acrylic acid from propiolactone it may be used for the production of other, substituted, acrylic acids from the corresponding substituted lactones of monocarboxylic acids having at least one unsubstituted hydrogen atom on the alpha carbon and containing only unreactive hydrogen carbon substituents, such lactones having the formula:

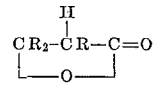

where each R may be hydrogen or an unreactive hydrocarbon radical such as an alkyl, aryl aralkyl or a cycloalkyl radical. Examples of lactones are beta-hydroxy butyric acid lactone, alpha-methyl hydracrylic acid lactone, beta-hydroxy n-valeric acid lactone, beta-hydroxy alpha methyl butyric acid lactone, alpha-ethyl hydracrylic acid lactone, beta-hydroxy isovaleric acid lactone, beta-hydroxy n-capric acid lactone, beta-hydroxy alpha-methyl valeric acid lactone, beta-methyl beta-ethyl hydracrylic acid lactone, alpha-methyl beta-ethyl hydracrylic acid lactone, alpha-methyl beta-methyl hydracrylic acid lactone, alpha-propyl hydracrylic acid lactone, alpha-butyl hydracrylic acid lactone, beta-methyl beta-propyl hydracrylic acid lactone and the like; the beta lactones of aryl substituted carboxylic acids such as beta-phenyl hydracrylic acid lactone, alpha-phenyl hydracrylic acid lactone and the like and other beta lactones of substituted carboxylic acids such as beta-cyclohexyl hydracrylic acid lactone, beta-benzyl hydracrylic acid lactone and the like. The treatment of this invention produces the alpha- beta unsaturated acid having the same number of carbon atoms as the lactone, and having the formula $CR_2=CR-COOH$.

As pointed out previously, the present invention is operable with the lactone in monomeric or polymeric form, and it will be understood that the references to "lactone" in the claims refer to both the monomeric and polymeric forms unless otherwise specified.

In the specific wroking example given on pages 6 and 7 above the lactone is essentially monomeric, its 97% purity being based on the content of monomeric lactone.

It is to be understood that the foregoing detailed description is given merely by way of illustration and that many variations may be made therein without departing from the spirit of our invention.

Having described our invention what we desire to secure by Letters Patent is:

1. Process for obtaining liquid acrylic acid from vapors thereof which comprises maintaining said vapors in superheated condition, mixing said superheated vapors with an inhibitor of the polymerization of acrylic acid, and condensing said vapors, said inhibitor being volatile at the temperature of said superheated vapors and condensing with said acrylic acid.

2. Process for obtaining liquid acrylic acid from vapors thereof which comprises maintaining said vapors in superheated condition, mixing said superheated vapors with an inhibitor of the polymerization of acrylic acid, and condensing said vapors, said inhibitor being volatile at the temperature of said superheated vapors and condensing with said acrylic acid, and preventing said vapors from condensing before admixing said vapors with said volatile inhibitor by maintaining all surfaces in contact with said vapors at a temperature above the dew point of the acrylic acid.

3. Process for obtaining liquid acrylic acid from vapors thereof which comprises maintaining said vapors in superheated condition, mixing said superheated vapors with a solution, in acrylic acid, of an inhibitor of the polymerization of acrylic acid, and condensing said vapors, said inhibitor being volatile at the temperature of said superheated vapors and condensing with said acrylic acid.

4. Process for obtaining liquid acrylic acid from vapors thereof which comprises maintaining said vapors in superheated condition, mixing said superheated vapors with a solution, in acrylic acid, of an inhibitor of the polymerization of acrylic acid, thereby vaporizing said solution, and condensing said vapors, said inhibitor being volatile at the temperature of said superheated vapors and condensing with said acrylic acid, and preventing said vapors from condensing before admixing said vapors with said volatile inhibitor by maintaining all surfaces in contact with said vapors at a temperature above the dew point of the acrylic acid.

5. Process for obtaining liquid acrylic acid from vapors thereof which comprises supplying a continuous stream consisting essentially of said vapors, maintaining the vapors in said stream in superheated condition, mixing said superheated stream continuously with a liquid consisting essentially of a solution, in acrylic acid, of an inhibitor of the polymerization of acrylic acid, vaporizing said solution by the superheat of said stream, and continuously condensing the resulting mixture by cooling to below the dew point of said acrylic acid, while maintaining any surfaces in contact with uninhibited acrylic acid above the dew point of said acrylic acid, said inhibitor being a phenol which vaporizes at the temperature of said stream and condenses with said acrylic acid.

References Cited

UNITED STATES PATENTS

| 3,002,017 | 9/1961 | Wearsch et al. | 260—526 |
| 2,786,739 | 3/1957 | Eck, et al. | 260—486 |

OTHER REFERENCES

P. H. Groggins, Unit Processes In Organic Synthesis, 4th Edition, New York, McGraw-Hill, 1952, Chapter 12, p. 718.

Weiss Berger, Technique of Organic Chemistry, vol. 4, Interscience Publishers, (New York) 1951, p. 301.

LORRAINE A. WEINBERGER, Primary Examiner

M. G. BERGER, Assistant Examiner

U.S. Cl. X.R.

203—8

UNITED STATES PATENT OFFICE
CERTIFICATE OF CORRECTION

Patent No. 3,462,484                      August 19, 1969

Arthur W. Schnizer et al.

It is certified that error appears in the above identified patent and that said Letters Patent are hereby corrected as shown below:

Column 3, line 39, "the" should read -- then --.

Signed and sealed this 2nd day of March 1971.

(SEAL)
Attest:

Edward M. Fletcher, Jr.
Attesting Officer

WILLIAM E. SCHUYLER, JR.
Commissioner of Patents